(12) United States Patent
Ramappan et al.

(10) Patent No.: US 8,755,987 B2
(45) Date of Patent: Jun. 17, 2014

(54) SYSTEM AND METHOD FOR TORQUE CONTROL IN A HOMOGENEOUS CHARGE COMPRESSION IGNITION ENGINE

(75) Inventors: Vijay Ramappan, Novi, MI (US); Darrell W. Burleigh, South Lyon, MI (US); Ben W. Moscherosch, Waterford, MI (US)

(73) Assignee: GM Global Technology Operations LLC

( * ) Notice: Subject to any disclaimer, the term of this patent is extended or adjusted under 35 U.S.C. 154(b) by 567 days.

(21) Appl. No.: 13/112,524

(22) Filed: May 20, 2011

(65) Prior Publication Data
US 2012/0296557 A1 Nov. 22, 2012

(51) Int. Cl.
*B60T 7/12* (2006.01)
(52) U.S. Cl.
USPC .................. 701/103; 123/406.23; 123/681
(58) Field of Classification Search
CPC ............ F02D 41/3029; F02D 13/0203; F02D 2013/00
USPC .................. 123/319, 339.1, 339.16, 339.18, 123/339.19, 406.23, 434, 681; 701/103–105
See application file for complete search history.

(56) References Cited

U.S. PATENT DOCUMENTS

| | | | |
|---|---|---|---|
| 7,194,996 B2* | 3/2007 | Koopmans ................... 123/295 |
| 8,000,882 B2* | 8/2011 | Ramappan et al. ........... 701/108 |
| 8,276,555 B2* | 10/2012 | Kang et al. ................. 123/90.15 |
| 8,322,324 B2* | 12/2012 | Ramappan et al. ........... 123/295 |
| 2008/0127933 A1* | 6/2008 | Blumberg et al. ............ 123/304 |
| 2010/0242901 A1* | 9/2010 | Seto et al. ................... 123/299 |
| 2011/0283972 A1* | 11/2011 | Wermuth et al. ........ 123/406.12 |

* cited by examiner

*Primary Examiner* — John Kwon (57) ABSTRACT

A control system for a homogeneous charge compression ignition (HCCI) engine includes first and second modules. The first module determines a load on the HCCI engine when the HCCI engine is operating in an HCCI combustion mode. The second module controls torque generated by the HCCI engine based on the determined load and a predetermined threshold, wherein the second module controls the torque generated by the HCCI engine by controlling fueling of the HCCI engine.

18 Claims, 5 Drawing Sheets

SYSTEM AND METHOD FOR TORQUE CONTROL IN A HOMOGENEOUS CHARGE COMPRESSION IGNITION ENGINE

FIELD

The present disclosure relates to engine control systems and more particularly to a system and method for torque control in a homogeneous charge compression ignition (HCCI) engine.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. An ignition timing control system adjusts the spark timing in order achieve the optimized spark timing for desired torque. Increasing the amount of air and optimizing fuel and spark timing provided to the cylinders increases the torque output of the engine. Engine control systems have been developed to control engine output torque to achieve a desired torque and also rapidly or immediately change torque levels.

SUMMARY

A control system for a homogeneous charge compression ignition (HCCI) engine includes first and second modules. The first module determines a load on the HCCI engine when the HCCI engine is operating in an HCCI combustion mode. The second module controls torque generated by the HCCI engine based on the determined load and a predetermined threshold, wherein the second module controls the torque generated by the HCCI engine by controlling fueling of the HCCI engine.

A method for controlling a homogeneous charge compression ignition (HCCI) engine includes determining a load on the HCCI engine when the HCCI engine is operating in an HCCI combustion mode, and controlling torque generated by the HCCI engine based on the determined load and a predetermined threshold, wherein the torque generated by the HCCI engine is controlled by controlling fueling of the HCCI engine.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Homogeneous charge compression ignition (HCCI) engines may operate in different modes. In a first mode (also known as "HCCI mode"), compression in the cylinders combusts the air/fuel (NE) mixture provided to the cylinders. In a second mode (also known as "mixed mode"), spark initiates combustion of the A/F mixture provided to the cylinders. In the second mode, spark timing may be the primary mechanism for adjusting the torque output rapidly. During these periods of rapid or immediate torque changes, the engine may operate sub-optimally in order to deliver the requested torque. Controlling airflow after changing fuel flow in order to optimize airflow ratio may provide for returning to best operating efficiency.

In the first mode, however, spark timing does not influence torque production. Therefore, fuel flow and/or injection timing is typically used to adjust torque output rapidly or immediately while operating in the first mode. As previously mentioned, controlling airflow after changing fuel flow in order to optimize airflow ratio may provide for a return to best operating efficiency or predicted torque levels. Specifically, airflow which is controlled via a throttle, an intake camshaft, and/or an exhaust camshaft has a slower response compared to engine combustion event based parameters like spark, fuel quantity, or fuel injection timing control. Therefore, in response to sudden/unanticipated loads on the engine, the delay may cause noise, vibration, and/or harshness (NVH) which may result in driver discomfort.

Figure 1:
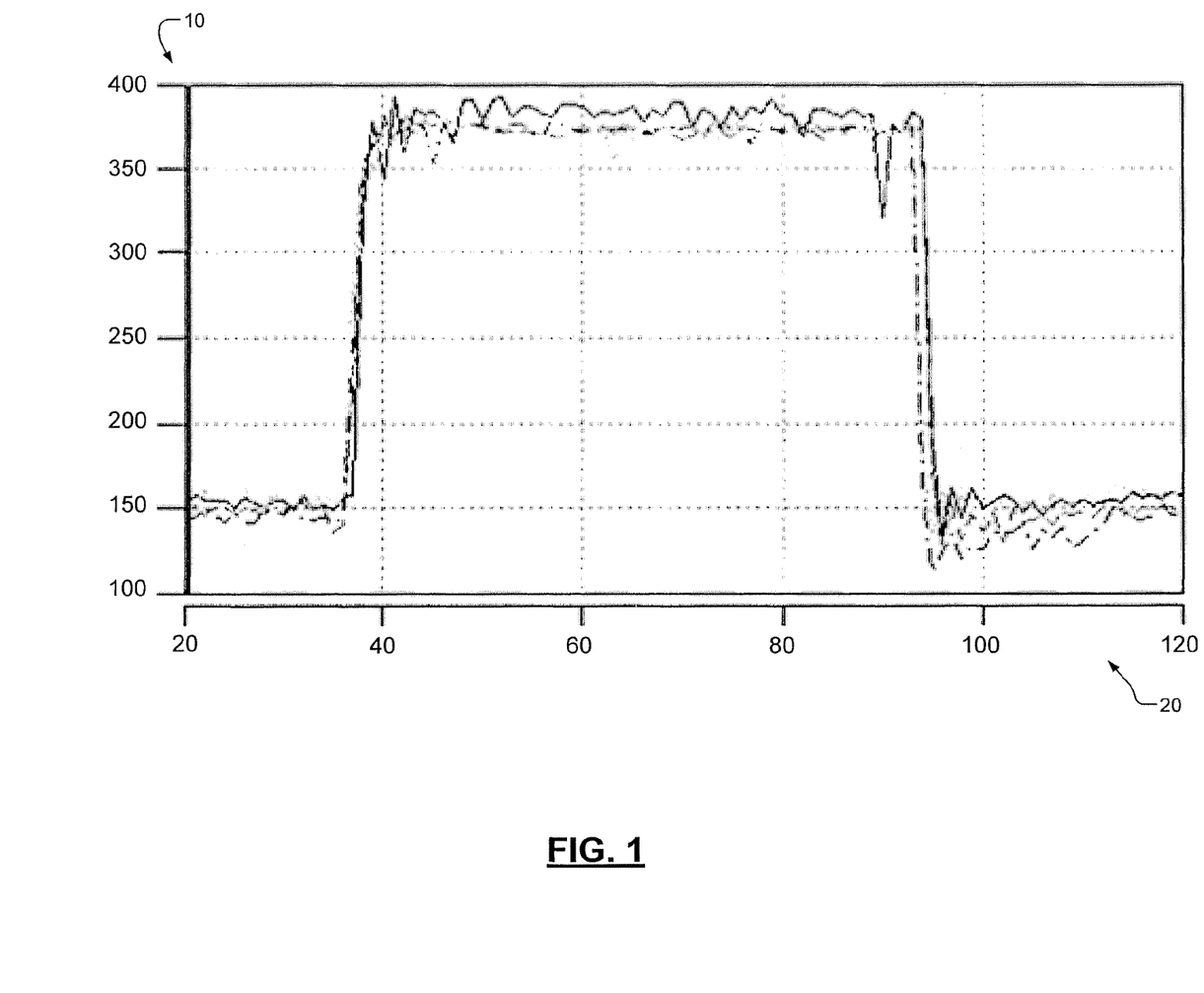
FIG. 1 illustrates the rapid change in torque while operating an engine in homogeneous charge compression ignition (HCCI) mode.

For example, FIG. 1 illustrates engine dynamometer results of immediate torque output of an engine operating in HCCI mode for various cylinders (1-4) by changing fuel quantity while the air flow is unchanged. A vertical axis 10 represents indicated mean effective pressure (IMEP) (e.g., in kPa), and horizontal axis 20 represent engine cycle (e.g., in crank angle degrees, or CAD).

Accordingly, a system and method are presented for rapid torque control in an HCCI engine. The system and method may also be used to generate a torque reserve when the engine is operating in the HCCI combustion mode by operating sub-optimally. The torque reserve may represent an amount (e.g., a percentage) of additional torque available by changing the fast actuators like fuel quantity, fuel timing and spark timing at a given speed or load. When the engine is operating in the mixed combustion mode, the system and method may rapidly or immediately control torque generated by the engine by controlling spark timing in the engine. When the engine is operating in the HCCI combustion mode, however, the system and method may determine whether a load on the engine increases above a predetermined threshold. For example, the load increase may be a result of (i) an end of a deceleration fuel cutoff (DFCO) event, (ii) activation of an air conditioning (NC) compressor, (iii) activation of a power steering (PS) pump, and/or (iv) a shift operation of a transmission.

When the load is less than the predetermined threshold, the system and method may control torque generated by the engine by controlling fuel flow and/or fuel injection timing. Alternatively, when the load is greater than the predetermined threshold, the system and method may increase torque generated by the engine by controlling both fueling and airflow to the engine. For example, the system and method may control intake and/or exhaust camshaft timing to control airflow (i.e., air per cylinder, or APC). Specifically, for rapid or immediate torque changes in HCCI mode, the system and method may control (i) a mass of fuel injected into the engine and/or (ii) a timing of fuel injection in the engine. Additionally, in mixed mode, the system and method may control spark timing for rapid or immediate torque control.

Figure 2:
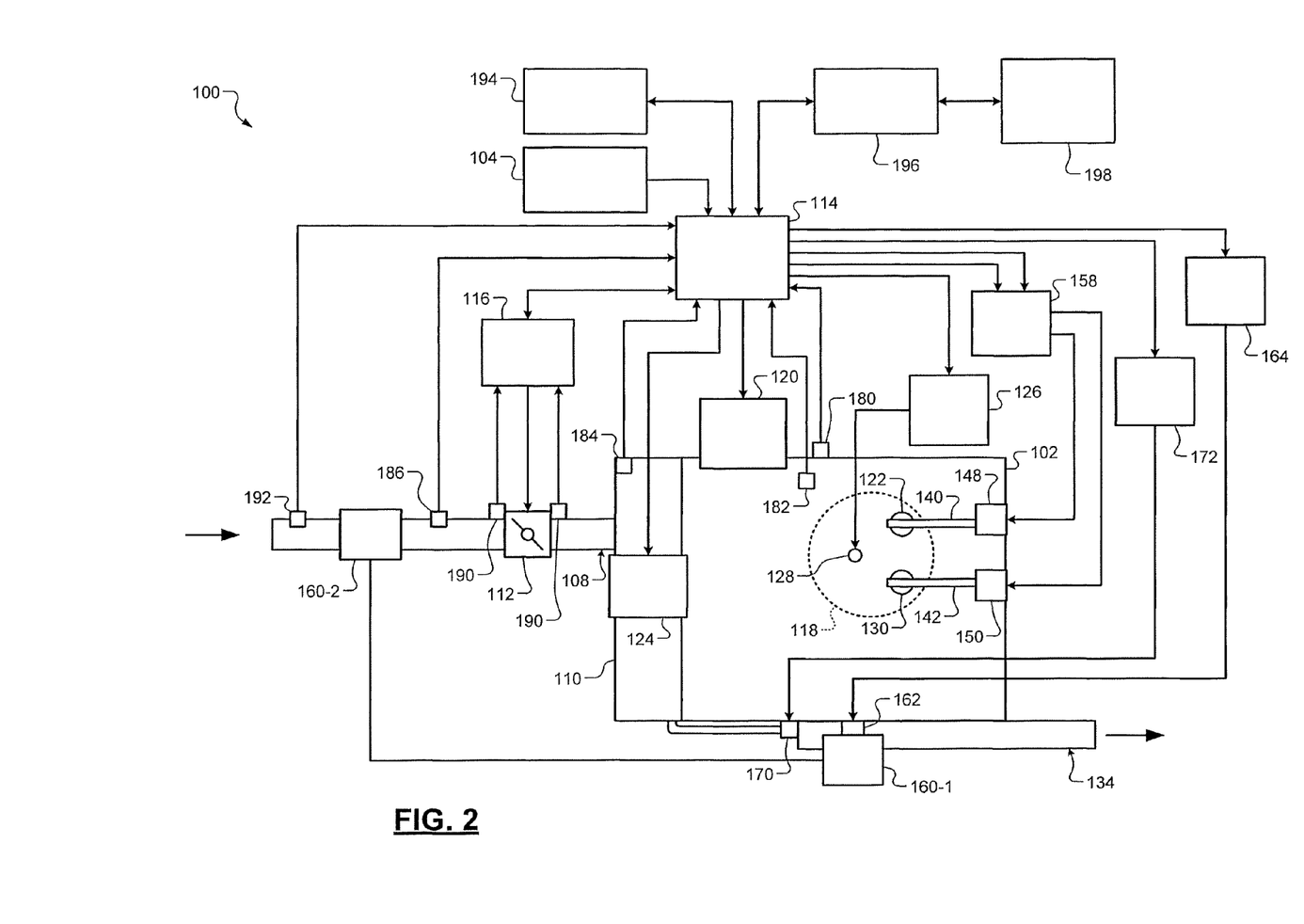
FIG. 2 is a functional block diagram of an example engine system according to one implementation of the present disclosure.

Referring now to FIG. 2, a functional block diagram of an exemplary engine system 100 is presented. The engine system 100 includes an engine 102 that combusts an air/fuel mixture to produce drive torque for a vehicle based on driver input from a driver input module 104. For example, the engine 102 may be an HCCI engine and therefore may operate in different modes. Air is drawn into the engine 102 through an intake system 108. For example only, the intake system 108 may include an intake manifold 110 and a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a boost device that provides pressurized air to the intake manifold 110. For example, FIG. 2 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven electrically or by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an actuator that receives an actuator value. For example, the throttle actuator module 116 may be referred to as an actuator and the throttle opening area may be referred to as the actuator value. In the example of FIG. 2, the throttle actuator module 116 achieves the throttle opening area by adjusting an angle of the blade of the throttle valve 112.

Similarly, the spark actuator module 126 may be referred to as an actuator, while the corresponding actuator value may be the amount of spark advance relative to cylinder TDC. Other actuators may include the cylinder actuator module 120, the fuel actuator module 124, the phaser actuator module 158, the boost actuator module 164, and the EGR actuator module 172. For these actuators, the actuator values may correspond to number of activated cylinders, fueling rate, intake and exhaust cam phaser angles, boost pressure, and EGR valve opening area, respectively. The ECM 114 may control actuator values in order to cause the engine 102 to generate a desired engine output torque.

Figure 3:
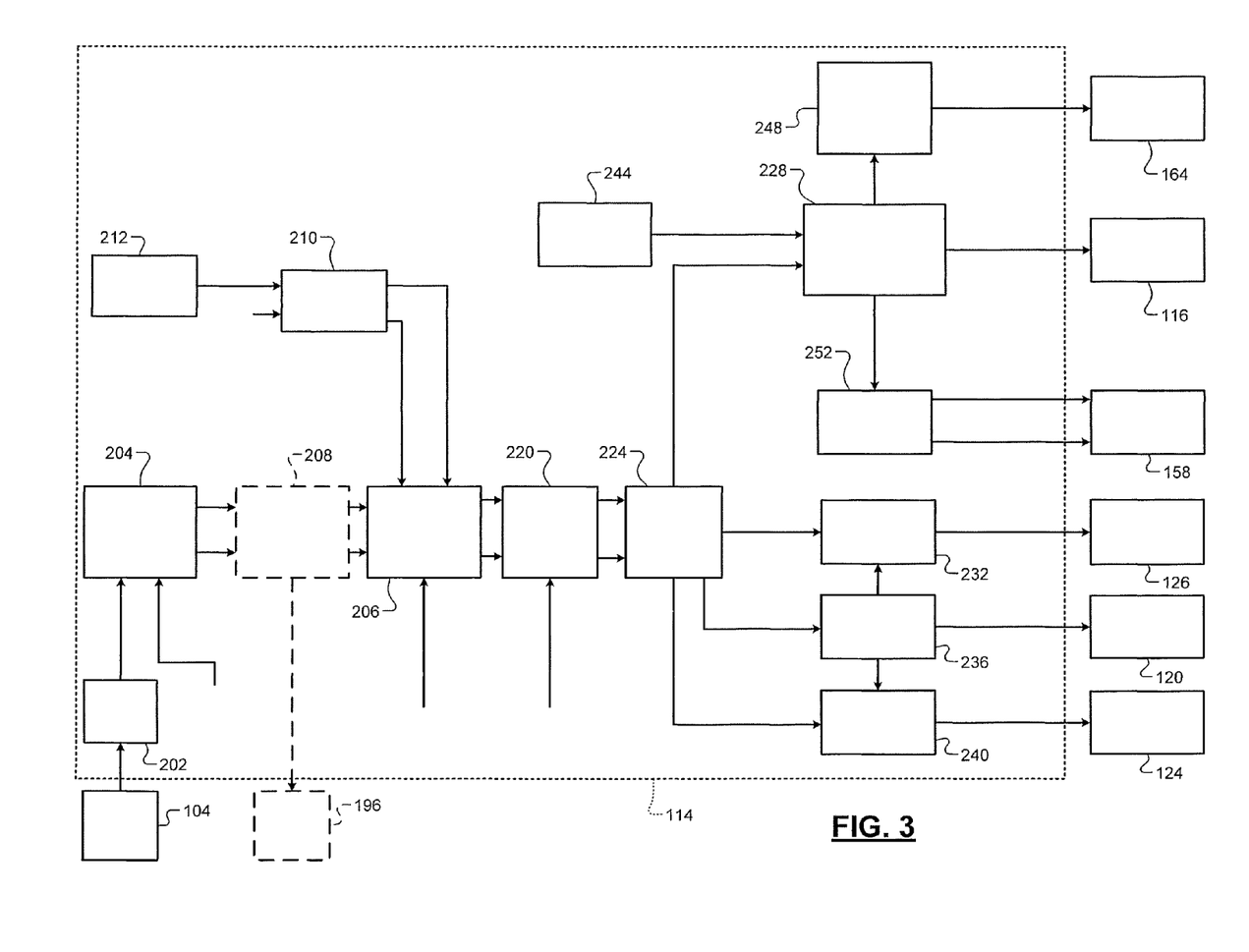
FIG. 3 is a functional block diagram of an example engine control module (ECM) according to one implementation of the present disclosure.

Referring now to FIG. 3, a functional block diagram of an exemplary engine control system is presented. An exemplary implementation of the ECM 114 includes a driver torque module 202. The driver torque module 202 may determine a driver torque request based on a driver input from the driver input module 104. The driver input may be based on a position of an accelerator pedal. The driver input may also be based on cruise control, which may be an adaptive cruise control system that varies vehicle speed to maintain a predetermined following distance. The driver torque module 202 may store one or more mappings of accelerator pedal position to desired torque, and may determine the driver torque request based on a selected one of the mappings.

An axle torque arbitration module 204 arbitrates between the driver torque request from the driver torque module 202 and other axle torque requests. Axle torque (torque at the wheels) may be produced by various sources including an engine and/or an electric motor. Torque requests may include absolute torque requests as well as relative torque requests and ramp requests. For example only, ramp requests may include a request to ramp torque down to a minimum engine off torque or to ramp torque up from the minimum engine off torque. Relative torque requests may include temporary or persistent torque reductions or increases.

Axle torque requests may include a torque reduction requested by a traction control system when positive wheel slip is detected. Positive wheel slip occurs when axle torque overcomes friction between the wheels and the road surface, and the wheels begin to slip against the road surface. Axle torque requests may also include a torque increase request to counteract negative wheel slip, where a tire of the vehicle slips in the other direction with respect to the road surface because the axle torque is negative.

Axle torque requests may also include brake management requests and vehicle over-speed torque requests. Brake management requests may reduce axle torque to ensure that the axle torque does not exceed the ability of the brakes to hold the vehicle when the vehicle is stopped. Vehicle over-speed torque requests may reduce the axle torque to prevent the vehicle from exceeding a predetermined speed. Axle torque requests may also be generated by vehicle stability control systems.

The axle torque arbitration module 204 outputs a predicted torque request and an immediate torque request based on the results of arbitrating between the received torque requests. As described below, the predicted and immediate torque requests from the axle torque arbitration module 204 may selectively be adjusted by other modules of the ECM 114 before being used to control actuators of the engine system 100.

In general terms, the immediate torque request is the amount of currently desired axle torque, while the predicted torque request is the amount of axle torque that may be needed on short notice. The ECM 114 therefore controls the engine system 100 to produce an axle torque equal to the immediate torque request. However, different combinations of actuator values may result in the same axle torque. The ECM 114 may therefore adjust the actuator values to allow a faster transition to the predicted torque request, while still maintaining the axle torque at the immediate torque request.

In various implementations, the predicted torque request may be based on the driver torque request. The immediate torque request may be less than the predicted torque request, such as when the driver torque request is causing wheel slip on an icy surface. In such a case, a traction control system (not shown) may request a reduction via the immediate torque request, and the ECM 114 reduces the torque produced by the engine system 100 to the immediate torque request. However, the ECM 114 controls the engine system 100 so that the engine system 100 can quickly resume producing the predicted torque request once the wheel slip stops.

In general terms, the difference between the immediate torque request and the higher predicted torque request can be referred to as a torque reserve. The torque reserve may represent the amount of additional torque that the engine system 100 can begin to produce with minimal delay. Fast engine actuators are used to increase or decrease current axle torque. As described in more detail below, fast engine actuators are defined in contrast with slow engine actuators.

In various implementations, fast engine actuators are capable of varying axle torque within a range, where the range is established by the slow engine actuators. In such implementations, the upper limit of the range is the predicted torque request, while the lower limit of the range is limited by the torque capacity of the fast actuators. For example only, fast actuators may only be able to reduce axle torque by a first amount, where the first amount is a measure of the torque capacity of the fast actuators. The first amount may vary based on engine operating conditions set by the slow engine actuators. When the immediate torque request is within the range, fast engine actuators can be set to cause the axle torque to be equal to the immediate torque request. When the ECM 114 requests the predicted torque request to be output, the fast engine actuators can be controlled to vary the axle torque to the top of the range, which is the predicted torque request.

In general terms, fast engine actuators can more quickly change the axle torque when compared to slow engine actuators. Slow actuators may respond more slowly to changes in their respective actuator values than fast actuators do. For example, a slow actuator may include mechanical components that require time to move from one position to another in response to a change in actuator value. A slow actuator may also be characterized by the amount of time it takes for the axle torque to begin to change once the slow actuator begins to implement the changed actuator value. Generally, this amount of time will be longer for slow actuators than for fast actuators. In addition, even after beginning to change, the axle torque may take longer to fully respond to a change in a slow actuator.

For example only, the ECM 114 may set actuator values for slow actuators to values that would enable the engine system 100 to produce the predicted torque request if the fast actuators were set to appropriate values. Meanwhile, the ECM 114 may set actuator values for fast actuators to values that, given the slow actuator values, cause the engine system 100 to produce the immediate torque request instead of the predicted torque request.

The fast actuator values therefore cause the engine system 100 to produce the immediate torque request. When the ECM 114 decides to transition the axle torque from the immediate torque request to the predicted torque request, the ECM 114 changes the actuator values for one or more fast actuators to values that correspond to the predicted torque request. Because the slow actuator values have already been set based on the predicted torque request, the engine system 100 is able to produce the predicted torque request after only the delay imposed by the fast actuators. In other words, the longer delay that would otherwise result from changing axle torque using slow actuators is avoided.

For example only, when the predicted torque request is equal to the driver torque request, a torque reserve may be created when the immediate torque request is less than the driver torque request due to a temporary torque reduction request. Alternatively, a torque reserve may be created by increasing the predicted torque request above the driver torque request while maintaining the immediate torque request at the driver torque request. The resulting torque reserve can absorb sudden increases in required axle torque. For example only, sudden loads from an air conditioner or a power steering pump may be counterbalanced by increasing the immediate torque request. If the increase in immediate torque request is less than the torque reserve, the increase can be quickly produced by using fast actuators. The predicted torque request may then also be increased to re-establish the previous torque reserve.

Another example use of a torque reserve is to reduce fluctuations in slow actuator values. Because of their relatively slow speed, varying slow actuator values may produce control instability. In addition, slow actuators may include mechanical parts, which may draw more power and/or wear more quickly when moved frequently. Creating a sufficient torque reserve allows changes in desired torque to be made by varying fast actuators via the immediate torque request while maintaining the values of the slow actuators. For example, to maintain a given idle speed, the immediate torque request may vary within a range. If the predicted torque request is set to a level above this range, variations in the immediate torque request that maintain the idle speed can be made using fast actuators without the need to adjust slow actuators.

For example only, in a spark-ignition engine, spark timing may be a fast actuator value, while throttle opening area may be a slow actuator value. Spark-ignition engines may combust fuels including, for example, gasoline and ethanol, by applying a spark. By contrast, in a compression-ignition engine, fuel flow and/or fuel injection timing may be a fast actuator value, while throttle opening area may be used as the slow actuator value. In mixed HCCI mode, spark timing may be a fast actuator value, while throttle opening area and/or intake and exhaust cam phasing may be a slow actuator values. Compression-ignition engines may combust fuels including, for example, diesel, by compressing the fuels.

When the engine 102 is a spark-ignition engine or an HCCI engine operating in mixed mode, the spark actuator module 126 may be a fast actuator and the throttle actuator module 116 may be a slow actuator. After receiving a new actuator value, the spark actuator module 126 may be able to change spark timing for the following firing event. When the spark timing (also called spark advance) for a firing event is set to a calibrated value, maximum torque is produced in the combustion stroke immediately following the firing event. However, a spark advance deviating from the calibrated value may reduce the amount of torque produced in the combustion stroke. Therefore, the spark actuator module 126 may be able to vary engine output torque as soon as the next firing event occurs by varying spark advance. For example only, a table of spark advances corresponding to different engine operating conditions may be determined during a calibration phase of vehicle design, and the calibrated value is selected from the table based on current engine operating conditions.

By contrast, changes in throttle opening area take longer to affect engine output torque. The throttle actuator module 116 changes the throttle opening area by adjusting the angle of the blade of the throttle valve 112. Therefore, once a new actuator value is received, there is a mechanical delay as the throttle valve 112 moves from its previous position to a new position based on the new actuator value. In addition, air flow changes based on the throttle valve opening are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke. The intake and exhaust cam timing by the phaser scheduling module 252 is faster than throttle opening area but is still slower than combustion event based control values like spark timing, fuel injection timing and fuel quantity.

Using these actuators as an example, a torque reserve can be created by setting the throttle opening area and/or intake and exhaust cam phasing to a value that would allow the engine 102 to produce a predicted torque request. Meanwhile, the spark timing can be set based on an immediate torque request that is less than the predicted torque request. Although the throttle opening area and/or intake and exhaust cam phasing generates enough air flow for the engine 102 to produce the predicted torque request, the spark timing is retarded (which reduces torque) based on the immediate torque request. The engine output torque will therefore be equal to the immediate torque request.

When additional torque is needed, such as when the air conditioning compressor is started, or when traction control determines wheel slip has ended, the spark timing can be set based on the predicted torque request. By the following firing event, the spark actuator module 126 may return the spark advance to a calibrated value, which allows the engine 102 to produce the full engine output torque achievable with the air flow already present. The engine output torque may therefore be quickly increased to the predicted torque request without experiencing delays from changing the throttle opening area.

When the engine 102 is a compression-ignition engine, the fuel actuator module 124 may be a fast actuator and the throttle actuator module 116 and/or the phase scheduling module 252 may be the slow actuators. In this manner, the fuel mass may be set based on the immediate torque request, and the throttle opening area and/or phaser scheduling may be set based on the predicted torque request. The throttle opening area and/or phaser scheduling may generate more air flow than necessary to satisfy the predicted torque request. In turn, the air flow generated may be more than required for optimal combustion of the injected fuel. The air/fuel ratio is usually lean in HCCI and changes in air flow within a certain range determined by the engine operating speed and load do not affect the engine torque output. The engine output torque will therefore be equal to the immediate torque request and may be increased or decreased quickly by adjusting the fuel flow.

The throttle actuator module 116, the phaser scheduling module 252, and the EGR actuator module 172 may be controlled based on the predicted torque request to control emissions and to minimize turbo lag. The throttle actuator module 116 may create a vacuum to draw exhaust gases through the EGR valve 170 and into the intake manifold 110. The boost actuator module 164 may also be used to control slow or predicted torque and to build a torque reserve.

The axle torque arbitration module 204 may output the predicted torque request and the immediate torque request to a propulsion torque arbitration module 206. In various implementations, the axle torque arbitration module 204 may output the predicted and immediate torque requests to a hybrid optimization module 208. The hybrid optimization module 208 determines how much torque should be produced by the engine 102 and how much torque should be produced by the electric motor 198. The hybrid optimization module 208 then outputs modified predicted and immediate torque requests to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests, including the converted predicted and immediate torque requests. The propulsion torque arbitration module 206 generates an arbitrated predicted torque request and an arbitrated immediate torque request. The arbitrated torques may be generated by selecting a winning request from among received requests. Alternatively or additionally, the arbitrated torques may be generated by modifying one of the received requests based on another one or more of the received requests.

Other propulsion torque requests may include torque reductions for engine over-speed protection, torque increases for stall prevention, and torque reductions requested by the transmission control module 194 to accommodate gear shifts. Propulsion torque requests may also result from fuel re-activation after a deceleration fuel cutoff event (DFCO), clutch fuel cutoff, which reduces the engine output torque when the driver depresses the clutch pedal in a manual transmission vehicle to prevent a flare (rapid rise) in engine speed.

Propulsion torque requests may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated torques.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

An RPM control module 210 may also output predicted and immediate torque requests to the propulsion torque arbitration module 206. The torque requests from the RPM control module 210 may prevail in arbitration when the ECM 114 is in an RPM mode. RPM mode may be selected when the driver removes their foot from the accelerator pedal, such as when the vehicle is idling or coasting down from a higher speed. Alternatively or additionally, RPM mode may be selected when the predicted torque request from the axle torque arbitration module 204 is less than a predetermined torque value.

The RPM control module 210 receives a desired RPM from an RPM trajectory module 212, and controls the predicted and immediate torque requests to reduce the difference between the desired RPM and the current RPM. For example only, the RPM trajectory module 212 may output a linearly decreasing desired RPM for vehicle coastdown until an idle RPM is reached. The RPM trajectory module 212 may then continue outputting the idle RPM as the desired RPM.

A reserves/loads module 220 receives the arbitrated predicted and immediate torque requests from the propulsion torque arbitration module 206. The reserves/loads module 220 may adjust the arbitrated predicted and immediate torque requests to create a torque reserve and/or to compensate for one or more loads. The reserves/loads module 220 then outputs the adjusted predicted and immediate torque requests to an actuation module 224.

For example only, a catalyst light-off process or a cold start emissions reduction process may require retarded spark advance. The reserves/loads module 220 may therefore increase the adjusted predicted torque request above the adjusted immediate torque request to create retarded spark for the cold start emissions reduction process. In another example, the air/fuel ratio of the engine and/or the mass air flow may be directly varied, such as by diagnostic intrusive equivalence ratio testing. Before beginning these processes, a torque reserve may be created or increased to quickly offset decreases in engine output torque that result from leaning the air/fuel mixture during these processes.

The reserves/loads module 220 may also create or increase a torque reserve in anticipation of a future load, such as power steering pump operation or engagement of an air conditioning (A/C) compressor clutch. The reserve for engagement of the NC compressor clutch may be created when the driver first requests air conditioning. The reserves/loads module 220 may increase the adjusted predicted torque request while leaving the adjusted immediate torque request unchanged to produce the torque reserve. Then, when the A/C compressor clutch engages, the reserves/loads module 220 may increase the immediate torque request by the estimated load of the NC compressor clutch.

The actuation module 224 receives the adjusted predicted and immediate torque requests from the reserves/loads module 220. The actuation module 224 determines how the adjusted predicted and immediate torque requests will be achieved. The actuation module 224 may be engine type specific. For example, the actuation module 224 may be implemented differently or use different control schemes for spark-ignition engines versus compression-ignition engines.

In various implementations, the actuation module 224 may define a boundary between modules that are common across all engine types and modules that are engine type specific. For example, engine types may include spark-ignition, compression-ignition, and other types such as HCCI. Modules prior to the actuation module 224, such as the propulsion torque arbitration module 206, may be common across engine types, while the actuation module 224 and subsequent modules may be engine type specific.

For example, in a spark-ignition and mixed mode HCCI engine, the actuation module 224 may vary the opening of the throttle valve 112 and/or intake and exhaust cam scheduling as a slow actuator that allows for a wide range of slow torque control. The actuation module 224 may disable cylinders using the cylinder actuator module 120, which also provides for a wide range of torque control, and may involve drivability and emissions concerns. The actuation module 224 may use spark timing as a fast actuator. However, spark timing may not provide as much range of torque control. In addition, the amount of torque control possible with changes in spark timing (referred to as spark reserve capacity) may vary as engine operating point and air flow changes.

In various implementations, the actuation module 224 may generate an air torque request based on the adjusted predicted torque request. The air torque request may be equal to the adjusted predicted torque request, setting air flow so that the adjusted predicted torque request can be achieved by changes to other actuators.

An air control module 228 may determine desired actuator values based on the air torque request. For example, the air control module 228 may control desired manifold absolute pressure (MAP), desired throttle area, and/or desired air per cylinder (APC). Desired MAP may be used to determine desired boost, and desired APC may be used to determine desired cam phaser positions. In various implementations, the air control module 228 may also determine an amount of opening of the EGR valve 170.

The actuation module 224 may also generate a spark torque request, a cylinder shut-off torque request, and a fuel torque request. The spark torque request may be used by a spark control module 232 to determine how much to retard the spark timing (which reduces engine output torque) from a calibrated spark advance.

The cylinder shut-off torque request may be used by a cylinder control module 236 to determine how many cylinders to deactivate. The cylinder control module 236 may instruct the cylinder actuator module 120 to deactivate one or more cylinders of the engine 102. In various implementations, a predefined group of cylinders may be deactivated jointly.

The cylinder control module 236 may also instruct a fuel control module 240 to stop providing fuel for deactivated cylinders and may instruct the spark control module 232 to stop providing spark for deactivated cylinders. In various implementations, the spark control module 232 only stops providing spark for a cylinder once any fuel/air mixture already present in the cylinder has been combusted.

In various implementations, the cylinder actuator module 120 may include a hydraulic system that selectively decouples intake and/or exhaust valves from the corresponding camshafts for one or more cylinders in order to deactivate those cylinders. For example only, valves for half of the cylinders are either hydraulically coupled or decoupled as a group by the cylinder actuator module 120. In various implementations, cylinders may be deactivated simply by halting provision of fuel to those cylinders, without stopping the opening and closing of the intake and exhaust valves. In such implementations, the cylinder actuator module 120 may be omitted.

The fuel control module 240 may vary the amount of fuel provided to each cylinder based on the fuel torque request from the actuation module 224. During normal operation of a spark-ignition engine, the fuel control module 240 may operate in an air lead mode in which the fuel control module 240 attempts to maintain a stoichiometric air/fuel ratio by controlling fuel flow based on air flow. The fuel control module 240 may determine a fuel mass that will yield stoichiometric combustion when combined with the current amount of air per cylinder. The fuel control module 240 may instruct the fuel actuator module 124 via the fueling rate to inject this fuel mass for each activated cylinder.

In compression-ignition systems, the fuel control module 240 may operate in a fuel lead mode in which the fuel control module 240 determines a fuel mass for each cylinder that satisfies the fuel torque request while minimizing emissions, noise, and fuel consumption. In the fuel lead mode, air flow is controlled based on fuel flow and may be controlled to yield a lean air/fuel ratio. In addition, the air/fuel ratio may be maintained above a predetermined level, which may prevent excessive particulate production in dynamic engine operating conditions.

A mode setting may determine how the actuation module 224 treats the adjusted immediate torque request. The mode setting may be provided to the actuation module 224, such as by the propulsion torque arbitration module 206, and may select modes including an inactive mode, a pleasible mode, a maximum range mode, and an auto actuation mode.

In the inactive mode, the actuation module 224 may ignore the adjusted immediate torque request and set engine output torque based on the adjusted predicted torque request. The actuation module 224 may therefore set the spark torque request, the fuel torque request, the cylinder shut-off torque request, and the fuel torque request to the adjusted predicted torque request, which maximizes engine output torque for the current engine air flow conditions. Alternatively, the actuation module 224 may set these requests to predetermined (such as out-of-range high) values to disable torque reductions from retarding spark, deactivating cylinders, or reducing the fuel/air ratio.

In the pleasible mode, the actuation module 224 outputs the adjusted predicted torque request as the air torque request and attempts to achieve the adjusted immediate torque request by adjusting only spark advance while operating in spark ignition and mixed mode HCCI and adjusting fuel quantity and/or fuel injection timing while operating in lean HCCI mode. The actuation module 224 therefore outputs the adjusted immediate torque request as the spark torque request and/or fuel torque request. The spark control module 232 will retard the spark and fuel control module 240 will modify fuel quantity and/or fuel injection timing as much as possible to attempt to achieve the spark or torque request, respectively. If the desired torque reduction is greater than the spark reserve capacity (the amount of torque reduction achievable by spark retard) or the fuel reserve capacity (the amount of torque reduction achievable by fuel quantity and/or fuel injection timing), the torque reduction may not be achieved. The engine output torque will then be greater than the adjusted immediate torque request.

In the maximum range mode, the actuation module 224 may output the adjusted predicted torque request as the air torque request and the adjusted immediate torque request as the spark or the fuel torque request. In addition, the actuation module 224 may decrease the cylinder shut-off torque request (thereby deactivating cylinders) when reducing spark advance or changing fuel quantity alone is unable to achieve the adjusted immediate torque request.

In the auto actuation mode, the actuation module 224 may decrease the air torque request based on the adjusted immediate torque request. In various implementations, the air torque request may be reduced only so far as is necessary to allow the spark control module 232 to achieve the adjusted immediate torque request by adjusting spark advance or the fuel control module 240 to achieve immediate torque request by adjusting fuel quantity and fuel injection timing. Therefore, in auto actuation mode, the adjusted immediate torque request is achieved while adjusting the air torque request as little as possible. In other words, the use of relatively slowly-responding throttle valve opening and cam scheduling is minimized by reducing the quickly-responding spark advance in spark ignited and mixed HCCI mode and fuel quantity/timing in HCCI mode as much as possible. This allows the engine 102 to return to producing the adjusted predicted torque request as quickly as possible.

A torque estimation module 244 may estimate torque output of the engine 102. This estimated torque may be used by the air control module 228 to perform closed-loop control of engine air flow parameters, such as throttle area, MAP, and phaser positions. For example, a torque relationship in spark-ignited mode such as $$T=f(APC,S,I,E,AF,OT,\#) \qquad (1)$$

may be defined, where torque (T) is a function of air per cylinder (APC), spark advance (S), intake cam phaser position (I), exhaust cam phaser position (E), air/fuel ratio (AF), oil temperature (OT), and number of activated cylinders (#). Additional variables may also be accounted for, such as the degree of opening of an exhaust gas recirculation (EGR) valve.

This relationship may be modeled by an equation and/or may be stored as a lookup table. The torque estimation module 244 may determine APC based on measured MAF and current RPM, thereby allowing closed loop air control based on actual air flow. The intake and exhaust cam phaser positions used may be based on actual positions, as the phasers may be traveling toward desired positions.

The actual spark advance may be used to estimate the actual engine output torque. When a calibrated spark advance value is used to estimate torque, the estimated torque may be called an estimated air torque, or simply air torque. The air torque is an estimate of how much torque the engine could generate at the current air flow if spark retard was removed (i.e., spark timing was set to the calibrated spark advance value) and all cylinders were fueled.

The air control module 228 may output a desired area signal to the throttle actuator module 116. The throttle actuator module 116 then regulates the throttle valve 112 to produce the desired throttle area. The air control module 228 may generate the desired area signal based on an inverse torque model and the air torque request. The air control module 228 may use the estimated air torque and/or the MAF signal in order to perform closed loop control. For example, the desired area signal may be controlled to minimize a difference between the estimated air torque and the air torque request.

The air control module 228 may output a desired manifold absolute pressure (MAP) signal to a boost scheduling module 248. The boost scheduling module 248 uses the desired MAP signal to control the boost actuator module 164. The boost actuator module 164 then controls one or more turbochargers (e.g., the turbocharger including the turbine 160-1 and the compressor 160-2) and/or superchargers.

The air control module 228 may also output a desired air per cylinder (APC) signal to a phaser scheduling module 252. Based on the desired APC signal and the RPM signal, the phaser scheduling module 252 may control positions of the intake and/or exhaust cam phasers 148 and 150 using the phaser actuator module 158.

Referring back to the spark control module 232, calibrated spark advance values may vary based on various engine operating conditions. For example only, a torque relationship may be inverted to solve for desired spark advance. For a given torque request ($T_{des}$), the desired spark advance ($S_{des}$) may be determined based on $$S_{des}=T^{-1}*T_{des},APC,I,E,AF,OT,\#). \qquad (2)$$

This relationship may be embodied as an equation and/or as a lookup table. The air/fuel ratio (AF) may be the actual air/fuel ratio, as reported by the fuel control module 240.

When the spark advance is set to the calibrated spark advance, the resulting torque may be as close to mean best torque (MBT) as possible. MBT refers to the maximum engine output torque that is generated for a given air flow as spark advance is increased, while using fuel having an octane rating greater than a predetermined threshold and using stoichiometric fueling. The spark advance at which this maximum torque occurs is referred to as MBT spark. The calibrated spark advance may differ slightly from MBT spark because of, for example, fuel quality (such as when lower octane fuel is used) and environmental factors. The torque at the calibrated spark advance may therefore be less than MBT.

Figure 4:
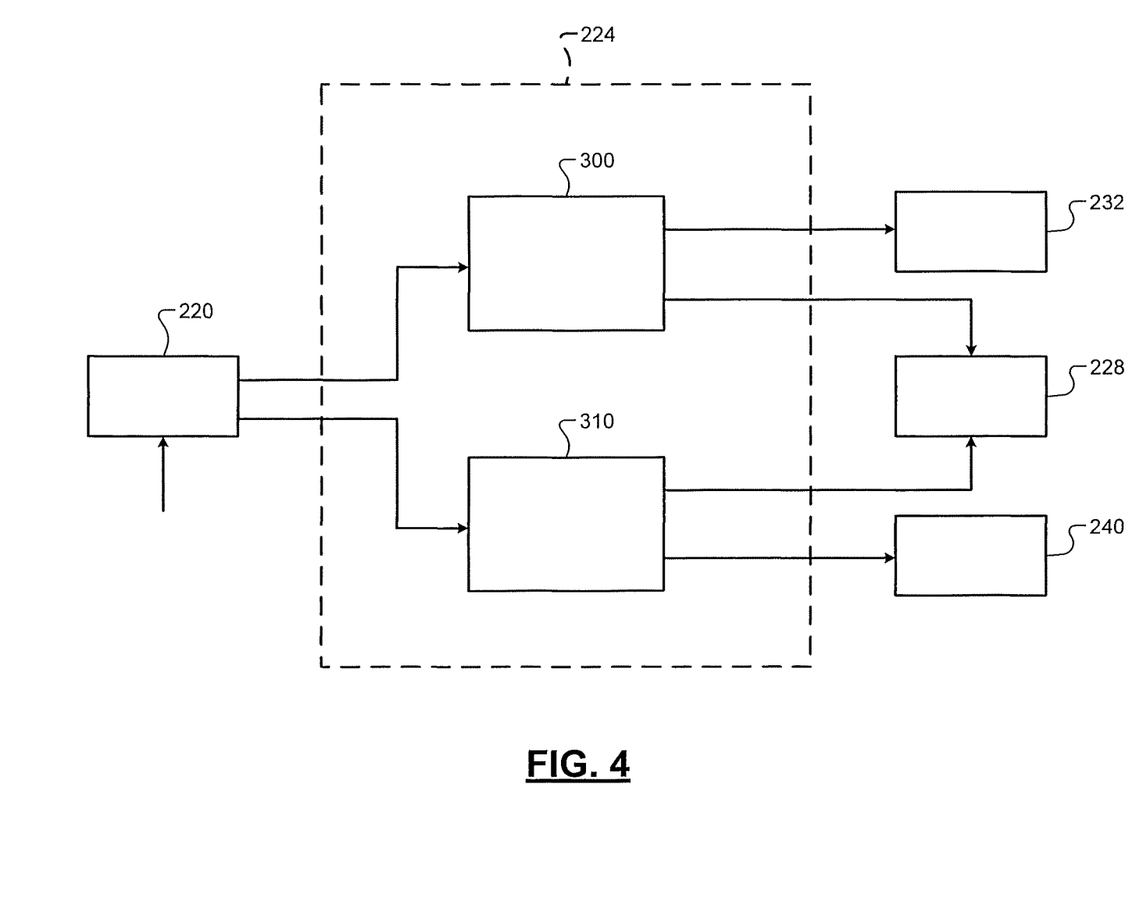
FIG. 4 is a functional block diagram of an example actuation module according to one implementation of the present disclosure.

Referring now to FIG. 4, an example of the actuation module 224 is shown. The actuation module 224 may include a mixed torque control module 300 and an HCCI torque control module 310. The actuation module 224 receives an immediate torque request ("desired torque") and a predicted torque request ("torque reserve") from the reserves/loads module 220. Specifically, the reserves/loads module 220 may generate the torque reserve when the engine 102 is operating in an HCCI combustion mode.

The mixed torque control module 300 may receive the desired torque and the torque reserve from the reserves/loads module 220. For example, the desired torque and the torque reserve may be determined as previously described herein. Specifically, the mixed torque control module 300 may control combustion within the engine 102 during mixed-mode combustion. The mixed torque control module 300 may control airflow by controlling intake and/or exhaust camshaft timing. For faster response, however, the mixed torque control module 300 may control spark timing.

The HCCI torque control module 310 may also receive the desired torque and the torque reserve from the reserves/loads module 220. The desired torque and the torque reserve, however, may be generated differently for HCCI operation. In particular, the torque reserve may be generated when the engine 102 is operating in the HCCI combustion mode. The HCCI torque control module 310 may then control combustion within the engine 102 during HCCI combustion. The HCCI torque control module 310 may control airflow by controlling intake and/or exhaust camshaft timing. For faster response, however, the HCCI torque control module 310 may control fueling and/or fuel injection timing of the engine 102.

The HCCI torque control module 310, therefore, may increase the torque generated by the engine 102 based on the determined load. The increase in torque generated by the engine 102 may be less than or equal to the torque reserve. Specifically, when the determined load is greater than a predetermined threshold, the HCCI torque control module 310 increases the torque generated by the engine 102 by controlling a mass of fuel injected into the engine 102. Additionally or alternatively, the HCCI torque control module 310 may increase the torque generated by the engine 102 by controlling a timing of fuel injection in the engine 102. Furthermore, in some implementations, the HCCI torque control module 310 may also adjust spark timing for additional torque control precision.

Figure 5:
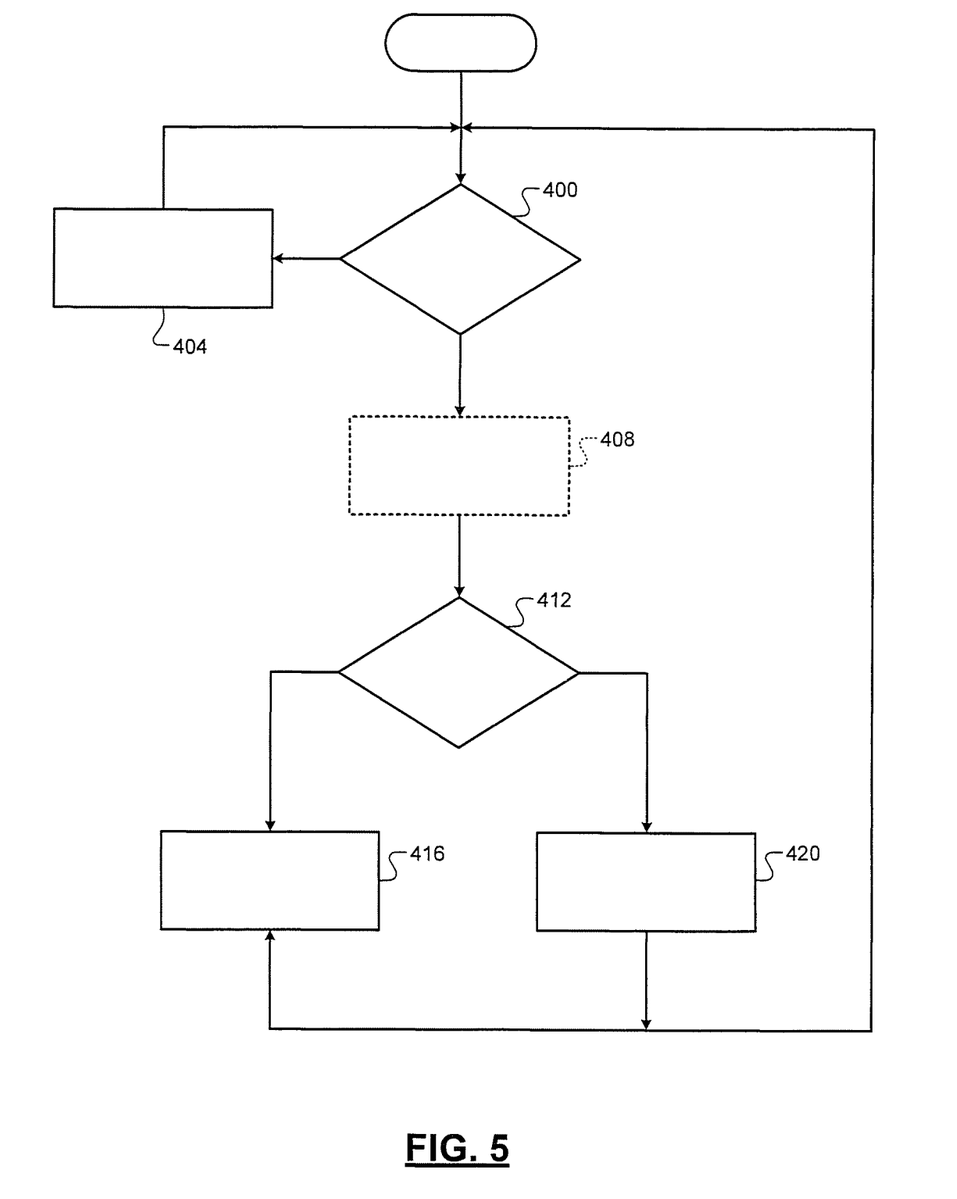
FIG. 5 is a flow diagram illustrating an example method for torque control in a homogeneous charge compression ignition (HCCI) engine according to one implementation of the present disclosure.

Referring now to FIG. 5, an example method for torque control in an HCCI engine begins at 400. At 400, the ECM 112 determines whether the engine 102 is operating in the HCCI combustion mode. If false, control may proceed to 404. If true, control may proceed to 408. At 404, the ECM 112 may control torque generated by the engine 102 via spark timing. Control may then return to 400. At 408, the ECM 112 may generate a torque reserve by operating the HCCI engine 102 at sub-optimal operating conditions. However, 408 may be optional and therefore in some implementations control may proceed from 404 to 412.

At 412, the ECM 112 may determine whether a load on the engine 102 is greater than a predetermined threshold. For example, the increase load may be in response to (i) an end of a DFCO event, (ii) activation of an A/C compressor, (iii) activation of a PS pump, or (iv) a shift operation of a transmission. If false, control may proceed to 416. If true, control may proceed to 420. At 416, the ECM 112 may control torque generated by the engine 102 via fuel mass and/or fuel injection timing. Control may then return to 400.

At 420, the ECM 112 may increase the torque generated by the engine 102 based on the load. Specifically, the ECM 112 may increase the torque generated by the engine 102 by controlling both airflow and fueling (i.e., fuel mass and/or fuel injection timing) to the engine 102. The increase in torque generated by the engine 102 may be less than or equal to a torque reserve. Control may then return to 400.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a homogeneous charge compression ignition (HCCI) engine, the control system comprising:
    a first module that determines a load on the HCCI engine when the HCCI engine is operating in an HCCI combustion mode;
    a second module that controls torque generated by the HCCI engine based on the determined load and a predetermined threshold, wherein the second module controls the torque generated by the HCCI engine by controlling fueling of the HCCI engine; and
    a third module that generates a torque reserve when the HCCI engine is operating in the HCCI combustion mode by operating the HCCI engine at sub-optimal operating conditions.

2. The control system of claim 1, wherein when the determined load is greater than the predetermined threshold, the second module increases the torque generated by the HCCI engine by controlling airflow and at least one of fuel mass and fuel injection timing.

3. The control system of claim 2, wherein the second module controls airflow by controlling intake and exhaust valve timing via intake and exhaust cam phasers, respectively.

4. The control system of claim 1, wherein when the determined load is less than the predetermined threshold, the second module controls the torque generated by the HCCI engine by controlling at least one of fuel mass and fuel injection timing.

5. The control system of claim 1, wherein the second module increases torque generated by the HCCI engine by an amount less than or equal to the torque reserve.

6. The control system of claim 1, wherein a load increase on the HCCI engine is a result of at least one of (i) activating an air conditioning (NC) compressor, (ii) activating a power steering (PS) pump, and (iii) shifting a transmission.

7. The control system of claim 1, wherein a load increase on the HCCI engine is a result of an end of a deceleration fuel cutoff (DECO) event.

8. The control system of claim 1, wherein the second module increases the torque generated by the HCCI engine during engine speed control.

9. The control system of claim 1, wherein when the HCCI engine is operating in a mixed combustion mode, a fourth module controls torque generated by the HCCI engine by controlling spark timing in the HCCI engine.

10. A method for controlling a homogeneous charge compression ignition (HCCI) engine, the method comprising:
determining a load on the HCCI engine when the HCCI engine is operating in an HCCI combustion mode; and
controlling torque generated by the HCCI engine based on the determined load and a predetermined threshold, wherein the torque generated by the HCCI engine is controlled by controlling fueling of the HCCI engine; and
generating a torque reserve when the HCCI engine is operating in the HCCI combustion mode by operating the HCCI engine at sub-optimal operating conditions.

11. The method of claim 10, further comprising airflow and at least one of fuel mass and fuel injection timing to increase the torque generated by the HCCI engine when the determined load is greater than the predetermined threshold.

12. The method of claim 11, further comprising controlling intake and exhaust valve timing via intake and exhaust cam phasers, respectively, to control airflow.

13. The method of claim 10, further comprising controlling at least one of fuel mass and fuel injection timing to control torque generated by the HCCI engine when the determined load is less than the predetermined threshold.

14. The method of claim 10, wherein increasing the torque generated by the HCCI engine includes increasing the torque generated by the HCCI engine by an amount less than or equal to the torque reserve.

15. The method of claim 10, wherein a load increase on the HCCI engine is a result of at least one of (i) activating an air conditioning (A/C) compressor, (ii) activating a power steering (PS) pump, and (iii) shifting a transmission.

16. The method of claim 10, wherein a load increase on the HCCI engine is a result of an end of a deceleration fuel cutoff (DFCO) event.

17. The method of claim 10, further comprising increasing the torque generated by the HCCI engine during engine speed control.

18. The method of claim 10, wherein further comprising controlling torque generated by the HCCI engine by controlling spark timing in the HCCI engine when the HCCI engine is operating in a mixed combustion mode.

* * * * *